US011423369B2

(12) United States Patent
Seidl et al.

(10) Patent No.: US 11,423,369 B2
(45) Date of Patent: Aug. 23, 2022

(54) CUSTOMER-MERCHANT INTERMEDIARY

(71) Applicant: BillGO, Inc., Fort Collins, CO (US)

(72) Inventors: Kelly Lynn Seidl, Fort Collins, CO (US); Daniel W. Holt, Steamboat Springs, CO (US); Scott M. Miller, Franklin, TN (US); Zachary David McAnally, Boulder, CO (US); Sara Sisenwein, Boulder, CO (US)

(73) Assignee: BillGO, Inc., Fort Collins, CO (US)

( * ) Notice: Subject to any disclaimer, the term of this patent is extended or adjusted under 35 U.S.C. 154(b) by 37 days.

(21) Appl. No.: 15/810,036

(22) Filed: Nov. 11, 2017

(65) Prior Publication Data

US 2019/0012646 A1 Jan. 10, 2019

Related U.S. Application Data

(60) Provisional application No. 62/437,022, filed on Dec. 20, 2016.

(51) Int. Cl.
*G06Q 20/08* (2012.01)
*G06Q 20/10* (2012.01)

(52) U.S. Cl.
CPC ....... *G06Q 20/0855* (2013.01); *G06Q 20/102* (2013.01)

(58) Field of Classification Search
CPC ......................... G06Q 20/0855; G06Q 20/102
See application file for complete search history.

(56) References Cited

U.S. PATENT DOCUMENTS

| 7,200,551 | B1 | 4/2007 | Senez |
| 7,788,603 | B2 * | 8/2010 | Lu ........................... G06F 16/95 |
| | | | 715/740 |
| 8,498,914 | B2 * | 7/2013 | Hazelhurst ........... G06Q 20/102 |
| | | | 705/40 |
| 9,164,779 | B2 * | 10/2015 | Brakensiek ......... G06F 3/04883 |
| 10,360,551 | B1 * | 7/2019 | Perry ................... G06Q 20/204 |
| 2002/0156846 | A1 * | 10/2002 | Rawat ................... G06F 40/174 |
| | | | 715/744 |
| 2003/0093289 | A1 | 5/2003 | Thornley et al. |
| 2003/0191711 | A1 * | 10/2003 | Jamison ................ G06Q 20/40 |
| | | | 705/40 |

(Continued)

FOREIGN PATENT DOCUMENTS

| EP | 3128479 A1 * | 2/2017 | ......... G06F 16/2365 |
| WO | 2006026772 A2 | 3/2006 | |

OTHER PUBLICATIONS

"Pichiliani and Hirata, Adaptation of Single-user Multi-touch Components to Support Synchronous Mobile Collaboration, Feb. 7, 2013, entire document" (Year: 2012).*

(Continued)

*Primary Examiner* — Hani M Kazimi
*Assistant Examiner* — Adam Hilmantel
(74) *Attorney, Agent, or Firm* — Faegre Drinker Biddle & Reath

(57) ABSTRACT

Described herein are technologies to facilitate online payment of bills to an online merchant while enabling a customer to retain her choices in the contractual relationship. For example, the technology described herein enables the customer to select the funding source of her choice and to modify the contractual relationship in the manner allowed by the online merchant.

20 Claims, 7 Drawing Sheets

(56) References Cited

U.S. PATENT DOCUMENTS

2012/0150615 A1* 6/2012 Isaacson ............... G06Q 20/10
 705/14.34
2016/0117651 A1* 4/2016 Davis ................. G06Q 20/3255
 705/40

OTHER PUBLICATIONS

Amy E. Buttell, "Reality Check—Third Party Bill Payment Services"—Consumers Digest (http://www.consumersdigest.com/money/article/reality-check-third-party-bill-payment-services/P2). pp. 2, retrieved Feb. 26, 2018.

* cited by examiner

CUSTOMER-MERCHANT INTERMEDIARY

BACKGROUND

There are many conventional online bill paying services in existence. Many banks offer a bill payment using a person's account with that bank. This interaction limits the payer's choice of funding to that held by the bank. Many merchants (e.g., stores, utilities, providers, etc.) allow for online bill payment.

BRIEF DESCRIPTION OF THE DRAWINGS

FIG. 2 shows an example of a customer-merchant relationship 200 with a go-between.

DETAILED DESCRIPTION

Described herein are technologies to facilitate payment of bills to a merchant while enabling a user to retain her choices in the contractual relationship.

With the technologies described herein, a customer may be a direct payer (i.e., the account holder or account owner) or an indirect payer to a merchant. The account holder is a person or business that has the relationship, outstanding bill, and/or debt with the merchant that is the subject of the interaction. The indirect payer is one who acts on behalf and with the authorization of the account holder. The indirect payer is a separate party who is not identical to the account holder or the merchant.

Figure 1:
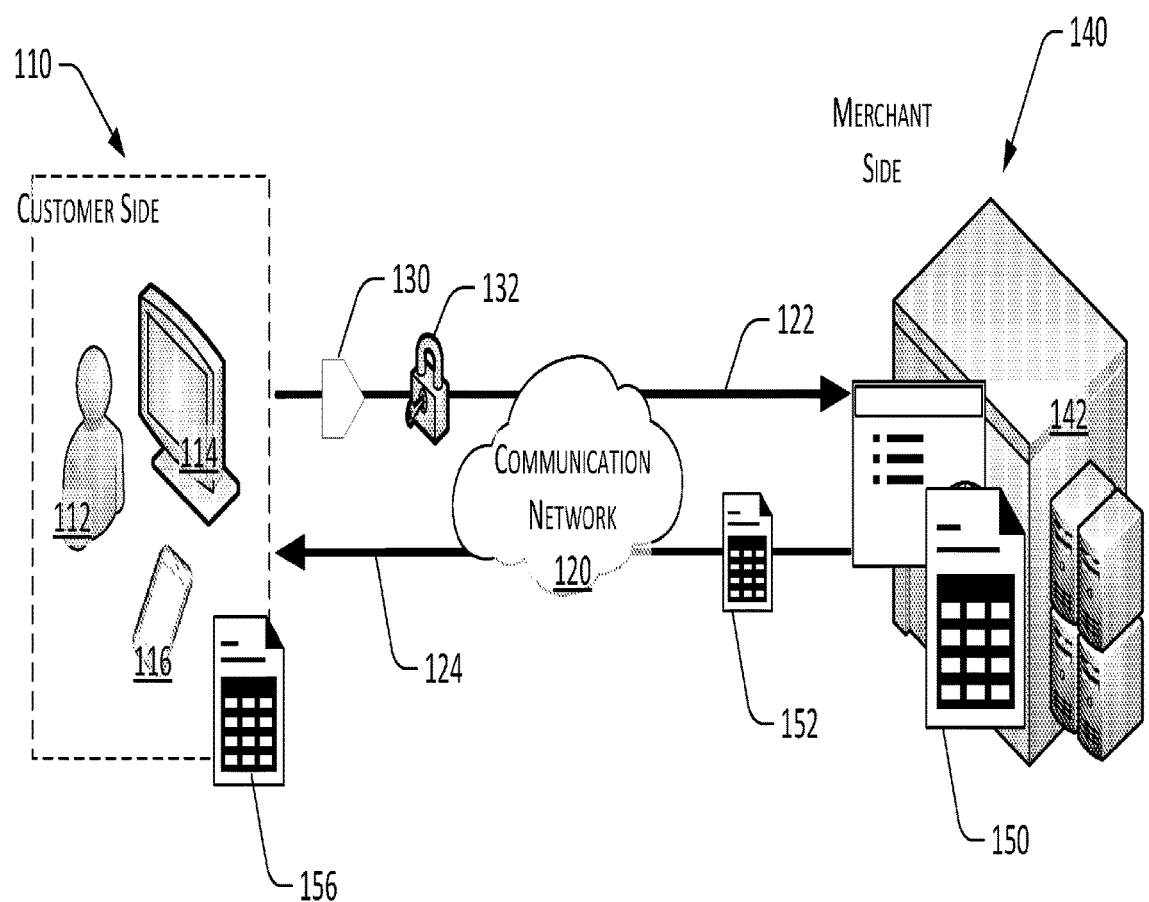
FIG. 1 illustrates an example of a direct customer-merchant relationship/interaction 100.

FIG. 1 illustrates an example of a direct customer-merchant relationship/interaction 100. There is a customer side 110 and an online merchant side 140. They are connected together by a communications network 120 (e.g., the Internet). Indeed, the connection via the communications network 120 is a primary reason why their relationship/integration is considered to be online.

The customer side 110 includes a direct customer 112 and one or more of his devices—such as computer 114 and mobile device 116. The merchant side 140 includes one or more physical sites 142 with one or more servers. In the direct customer-merchant relationship/interaction 100, the direct customer 112 is a direct payer, which may also be called the account holder or owner. The account holder is the person or business that has the relationship, outstanding bill, and/or debt with the merchant.

In an example of a typical interaction, the direct customer 112 accesses the merchant 142 using his online access tools (e.g., the web browser of the computer 114 or the mobile app of the mobile device 116). Typically, the direct customer sends customer-merchant credentials 132 and instructions 130 to the merchant 142.

The customer-to-merchant communication is indicated by arrow 122. The credential 132 is a specific credential (e.g., username/password pair) or customer identification data needed that authenticates the account holder or customer to the merchant. Once authenticated, the customer may interact with the merchant in any way that the merchant allows. For example, the customer may download his mobile phone usage logs 150. Log 152 on arrow 124 represents the downloading. And log 156 represents the downloaded log. This direct customer-merchant interaction 100 limits the payer of the online bill payment to the payer directly paying the merchant itself. Thus, the payer must maintain each relationship independently.

To alleviate those restrictions, third-party services are available. These third-party services are not associated/owned by the funding sources nor the online merchant. While there are many different types of third-party services, FIG. 2 illustrates the third-party acting as a go-between.

Figure 2:
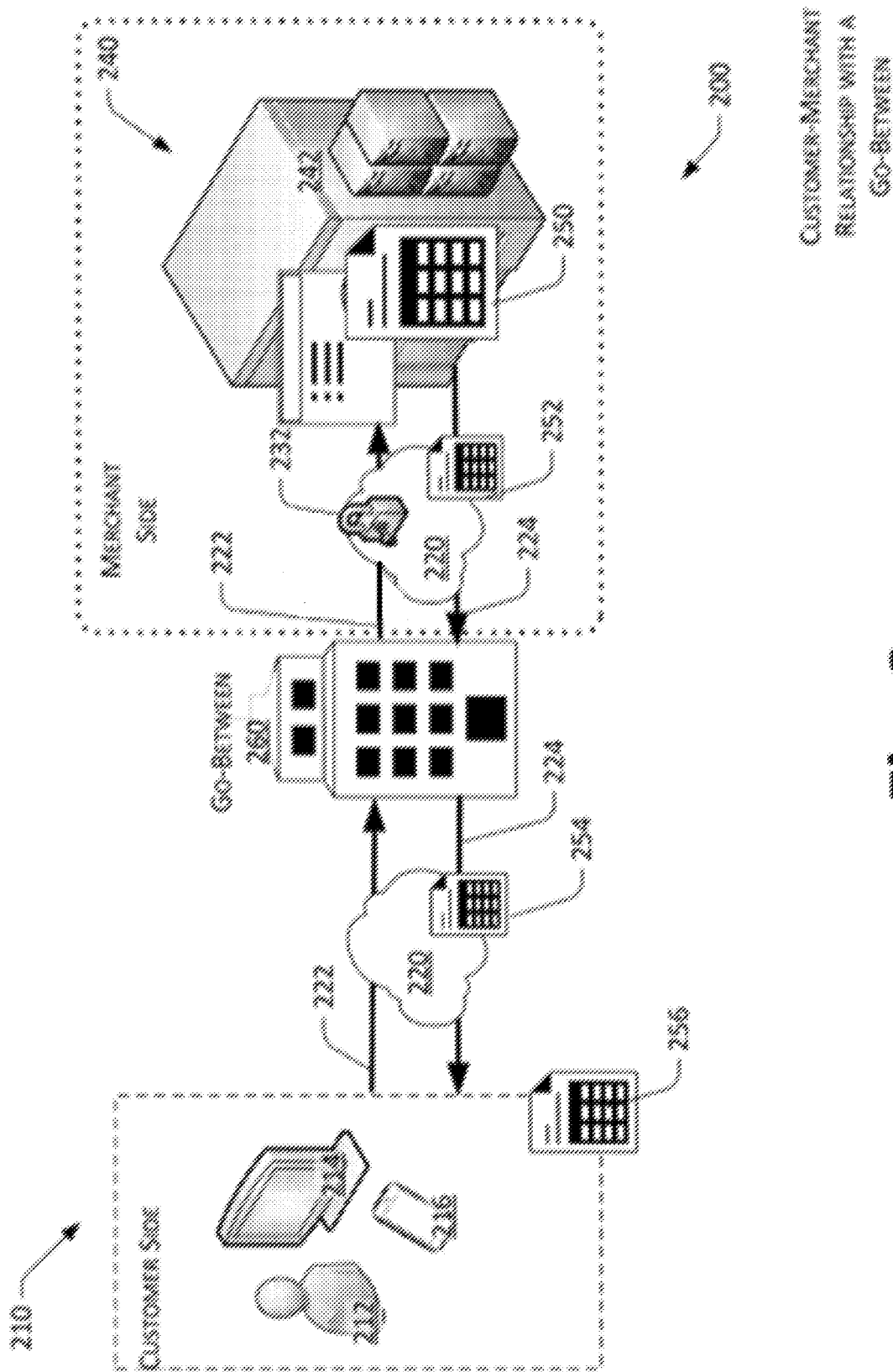

FIG. 2 shows an example of a customer-merchant relationship 200 with a go-between. There is a customer side 210 and an online merchant side 240. They are connected together by a communications network 220 (e.g., the Internet). However, in between this interaction is a third-party service that acts as a go-between 260.

The customer side 210 includes a direct customer 212 and one or more of his devices—such as computer 214 and mobile device 216. The merchant side 240 includes one or more physical sites 242 with one or more servers.

In an example of a typical interaction, the direct customer 212 accesses the merchant 242 using his online access tools (e.g., the web browser of the computer 214 or the mobile app of the mobile device 216). However, unlike the direct customer-merchant interaction 100, the go-between 260 functions as a connection for the direct customer 212 to the merchant 242.

As such, the go-between 260 gathers the customer-merchant credentials or customer identification data 232 from the direct customer 212. The go-between 260 sends those credentials or data to the merchant 242. Arrow 222 represents the direction of data and information flowing to the merchant. Also, the go-between 260 generates the necessary instructions/directions in order to access the online merchant 242.

Arrow 224 represents the flow of data from the merchant. Document 250 represents data about the account (e.g., phone usage logs). Document 252 represents the account data flowing from the merchant to the go-between 260. Document 254 represents the account data flowing from the go-between to the payer. Document 256 represents the data on the customer's machine or stored/displayed in a manner readily available to the customer.

In some implementations, the go-between may manage bill payment for the customer to the merchant. Typically, the go-between is limited. Primarily, it allows the direct customer to gain access to the online merchant. Once access is granted, it performs a basic interaction with the online merchant that consists primarily of pulling data from the online merchant. The typical go-between never engages in specific and complex interactions with the online merchants that potentially changes the specifics of the relationship between the customer and the online merchant.

Unlike the approaches shown in FIGS. 1 and 2, the technologies described herein facilitate a universal merchant intermediary (UMI) that allows a customer to access via a service (via the UMI) to manage, organize, track, monitor, etc. information and contractual relationship between the account holder and multiple disparate and unrelated merchants (e.g., retailers, utilities, service providers, etc.). For example, the UMI may direct changes in the contractual relationship (e.g., changing service plans, new subscriptions, etc.) with the merchant that the merchant normally requires to be done only when the account holder is directly communicating with the merchant by using the merchant's authorized communication tools (e.g., website, payment system, apps, etc.).

A customer accesses the UMI, which is an example implementation of the technology described herein. In some implementations, the customer provides the account-holder's credentials or account-holder's identification data for accessing a communication resource (e.g., website, payment system, or mobile app) of one or more particular merchants with which the account holder already has a relationship. For example, presume that an account holder has a mobile/wireless plan with a PHONIOUS, which is a fictitious cellular phone service provider.

In a typical case of an online communication, the account-holder's credentials includes a username and password pair for the account holder. A typical example of account-identification data includes the account number and zip code pair of the account holder.

With the account holder's credentials, the UMI securely accesses the one or more particular merchants' services. Using Application Programming Interfaces (APIs) of the online merchants, the UMI may, for example, retrieve the account holder's call usage from PHONIOUS and then make that data available to the customer at the intermediary. In this way, the customer need not access each particular merchant directly in order to gather such information.

However, unlike other approaches, the UMI enables the customer to change, modify, and/or update data on merchants' systems which support their contractual relationship. For example, using the UMI, the account holder may update her mailing address, billing address, email address, phone numbers, communication preferences, paper/paperless option, payment details, and the like.

Similarly, using the UMI, the customer may change the contractual relationship between an account holder and the merchant itself. For example, the customer may choose to upgrade her service plan (e.g., increasing her wireless data package) with PHONIOUS. In another example, she may upgrade her mobile phone to the latest model.

In addition to interactions that allow for changing of the contractual relationship, the UMI may facilitate other forms of interaction between the customer and the online resource of the merchant. For example, the UMI enables an online "chat" between the merchant's customer service representative and the customer. In such a scenario, the merchant's online resources interact across a communications network as if it was directly communicating with the customer. However, in reality, the UMI is acting as an intermediary for such communications.

In addition, some implementations may be performed without the account holder's interaction or initiation. In those instances, an implementation of the UMI may perform batch interactions with multiple online merchants without the account holder's particular direction/interaction for each merchant. That is, the UMI may act as a backend process only (i.e., with no frontend).

This may be done via a batch processing, for example, of files that contain account holder's credentials or customer identification data as well as the updates needed to those accounts such as making payments/payment method details, to things like making an update to service plans, addresses or similar. This might not be done without there being a UI or a particular interaction with a customer.

Customer-Merchant Interaction Customization

In acting as an intermediary in one or more implementations, the UMI is customized to establish communication with one or more merchants. This communication may be accomplished via one or more available online and offline communications mechanisms. Online communication mechanisms may use a website, a payment system, a mobile application ("app"), an application programming interface (API), web services, or the like to communicate between the UMI and merchants. Offline communication mechanisms may utilize telephony (i.e., "phone") systems, such as those using interactive voice response (IVR) technology.

When communicating with the merchants, the UMI has the capability to adjust one or more "knobs" that the merchant makes available to an account holder via these communication mechanisms. In this case, "knobs" is a metaphor for providing information, changing options, and/or configurations that are personal to the account holder and potentially significant to the merchant.

Herein, personal and significant refers to the type of interactions where the merchant expects the account holder to perform personally and directly. Generally, interactions that change the contractual relationship between the merchant and the account holder are an example of a personal and significant interaction.

Examples of such personal and significant interactions include (but are not limited to): changing personal or account information; managing authorized payers to the account; changing notification or communication preferences; adding/removing/changing payment methods or preferences; adding/removing/changing subscriptions, plans, services (including transferring/facilitating a move), or taking advantage of related offers presented to account holder (e.g. promotions); creating accounts, closing accounts, upgrading devices or equipment; managing the details of such equipment or devices; pulling payment details; performing transfers or similar; contacting customer support through chat, messaging, or IVR frameworks; performing an electronic deposit of a check; reporting lost/stolen cards; requesting a stop payment; ordering or requesting checks; add or apply for a new account or loan; providing/updating travel information; facilitating payment to an individual or organization and managing payee categories to support; viewing and accepting of contractual changes; updates to terms and conditions, etc.; and the like.

The UMI handles much of the workload associated with overarching changes across multiple merchants. For example, the UMI may be used to update/change an account holder's mailing address with multiple different merchants. Because of this, the account holder does not have to go to each website to update their address or name, but to be able to handle all/many directly through the UMI. Other items may be accomplished one by one (e.g., upgrading equipment is associated with a specific merchant/merchant account).

The UMI may enable the account holder to provide new or updated information to multiple merchants. This information is relevant to a customer-merchant relationship. Because of that, this new or updated information is a form of personal and significant information. Examples of the kind of new or updated information that may be provided to multiple merchants includes (but are not limited to): physical address of the account holder; mailing address; email address; telephone numbers; social media contact information; payment methods or preferences; personal or account information; creating accounts; closing accounts; authorized payers; notification or communication preferences; subscription plans; and service plan.

The UMI has tools for interacting with each available online resource of a merchant. Often these tools are particular and customized to each merchant and, perhaps, each resource. These tools may be generated in a manual, automatic, and semi-automatic manner. If manual, of course, human programmers examine the available resources offered by a merchant. They program the UMI tools to interact with the merchant in a manner that convincingly imitates a human account holder and allows for personal and significant interaction with all knobs.

If automatic, then one or more specially designed programs of the UMI investigates and analyzes the merchant's resources. From this, customized tools are generated for the UMI to interact with the merchant and allows for personal and significant interaction with all knobs.

Of course, the semi-automatic approach involves some combination of both manual and automatic. Regardless of the approach, the customization includes actions such as gathering information from/about the resources, utilizing available web and mobile API calls, and the like.

Since each merchant has its own way of interacting and ensuring that account holder's credentials and customer identification data are maintained, the customization (including usage patterns) is geared to making sure that the interactions happen in a manner that is consistent with the merchant's expectations.

Example Universal Merchant Intermediary Infrastructure

Figure 3:
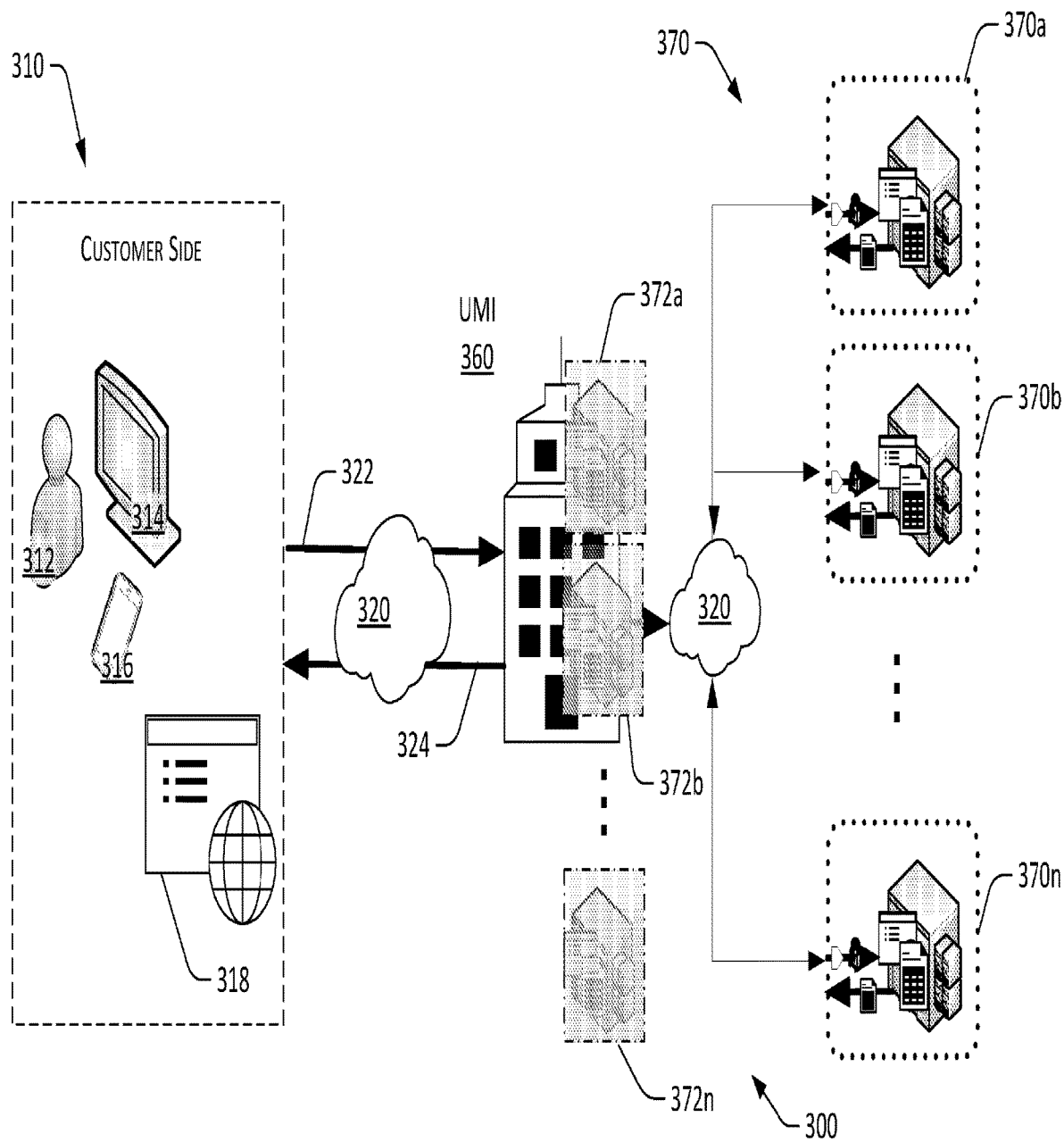
FIG. 3 shows an example universal merchant intermediary infrastructure 300 in accordance with one or more implementations described herein.

FIG. 3 shows an example universal merchant intermediary infrastructure 300 in accordance with one or more implementations described herein.

The example universal merchant intermediary infrastructure 300 includes a customer side 310, a merchant side 370, a universal merchant intermediary (UMI) 360, and a communications network 320 connecting them together.

The customer side 310 includes customer 312 and one or more devices for communicating across the communication network 320. Examples of appropriate devices include a computer 314 (e.g., laptop) and a mobile device 316 (e.g., a smartphone or tablet). Depending on the implementations, the customer 312 maybe either a direct or indirect customer.

Depending on the implementation, the communications network 320 may be wired, wireless, or a combination of both. Similarly, the communication network 320 may be point-to-point, circuit-switched, packet-switched, or the like. Depending on the implementation, the communications network 320 may be provide for online or offline forms of communication.

Online forms of communication contemplate continuous or nearly continuous availability to other resources connected to the same network. The Internet, World Wide Web, and the so-called cloud are common examples of online communications networks. A computer 314 or a mobile device 316, for example, may be used to establish an online communication via an online communication network.

Offline forms of communication contrasts with online forms in that communication with a resource is established by that resource forming a connection with the network and/or with the initiator of that communication. The traditional telephone network is a common example of an offline communication network. A mobile device 316, for example, may be used to establish an offline communication via an offline communication network.

Arrow 322 represents data flow from the customer 312 across the communications network 320. Arrow 324 represents data flow to the customer across the network. Instead of connecting directly with the online merchants, the customer connects to the UMI 360 across the communications network 320. Window 318 represents an online interaction with the UMI 360.

On behalf of the customer, the UMI 360 interacts with multiple merchants. Those interactions with the multiple merchants are represented by merchant 370a, 370b, and 370n. Each of these interactions may be over different communications networks and differing forms of communication (e.g., online vs. offline).

As part of these interactions, the UMI 360 establishes communication between itself and each merchant by providing identifying information to the merchant. In the case of online communications, the UMI 360 may provide the customer-merchant credentials. In some instances, the UMI 360 may provide customer identification data that is particular to the customer-merchant relationship between the account-holder and the merchant.

Examples of the customer-merchant credentials includes a username and password pair for the account holder with the merchant. Examples of account-identification data includes an account number and zip code pair of the account holder.

In some instances, the UMI 360 does not use customer-merchant credentials to establish communication. In these instances, the merchant allows for interaction on the account holder's behalf without the establishment of communication on behalf of the account holder without confirmation or authorization that the user is the account holder. For example, many merchants allow a payment to be made to an account holder's account simply by providing a genuine account number and valid payment information.

The UMI 360 has a backend mechanism and a frontend mechanism that work in coordination. With the customer's authorization, the backend mechanism establishes communication with one or more of the merchants (370a, 370b, 370n).

In some implementations, the customer may be online or interacting with the UMI 360 when the UMI interacts with the merchants. In other implementations, the UMI may take action out-of-sync with the customer being online with or interacting with the UMI.

Once the UMI 360 establishes communication with a merchant on behalf of the account holder, the backend mechanism maintains that communication. This is represented by the "ghost" representations 372a, 372b, 372n of the merchant interactions shown in FIG. 3. Since this is in the background and handled by the backend mechanism, the customer 312 does not see and does not experience the direct interactions between the UMI and the merchants (which is represented by the ghost merchant interactions 372a, 372b, 372n).

In maintaining the communications with the merchants, the UMI 360 takes appropriate actions and responds appropriately to the merchant. Here, "appropriate" means that the action that the backend mechanism takes is custom designed to simulate the call/response that would be made by the merchant's communication resources as if it was being used by a human—more particular the customer 312. As discussed above, this is accomplished by the manual, automated, and/or semi-automated tools created for each merchant's resources (e.g., websites, payments systems, mobile apps, web services, API or phone systems).

For example, the backend mechanism may use appropriately formatted API calls to interact with the online resources of a merchant.

The frontend mechanism of the UMI 360 provides the customer interface (UI) 318 on the device of the customer. Based on the information provided by the merchant, the frontend mechanism determines how best to present it to the customer via the UI 318. The frontend mechanism drives the UI to present the provided information in that way. Similarly, the backend mechanism obtains data from the customer and determines how best to deliver it to the merchant. The backend mechanism generates the appropriately formatted input to deliver that customer data to the merchant.

Example Methods

Figure 4:
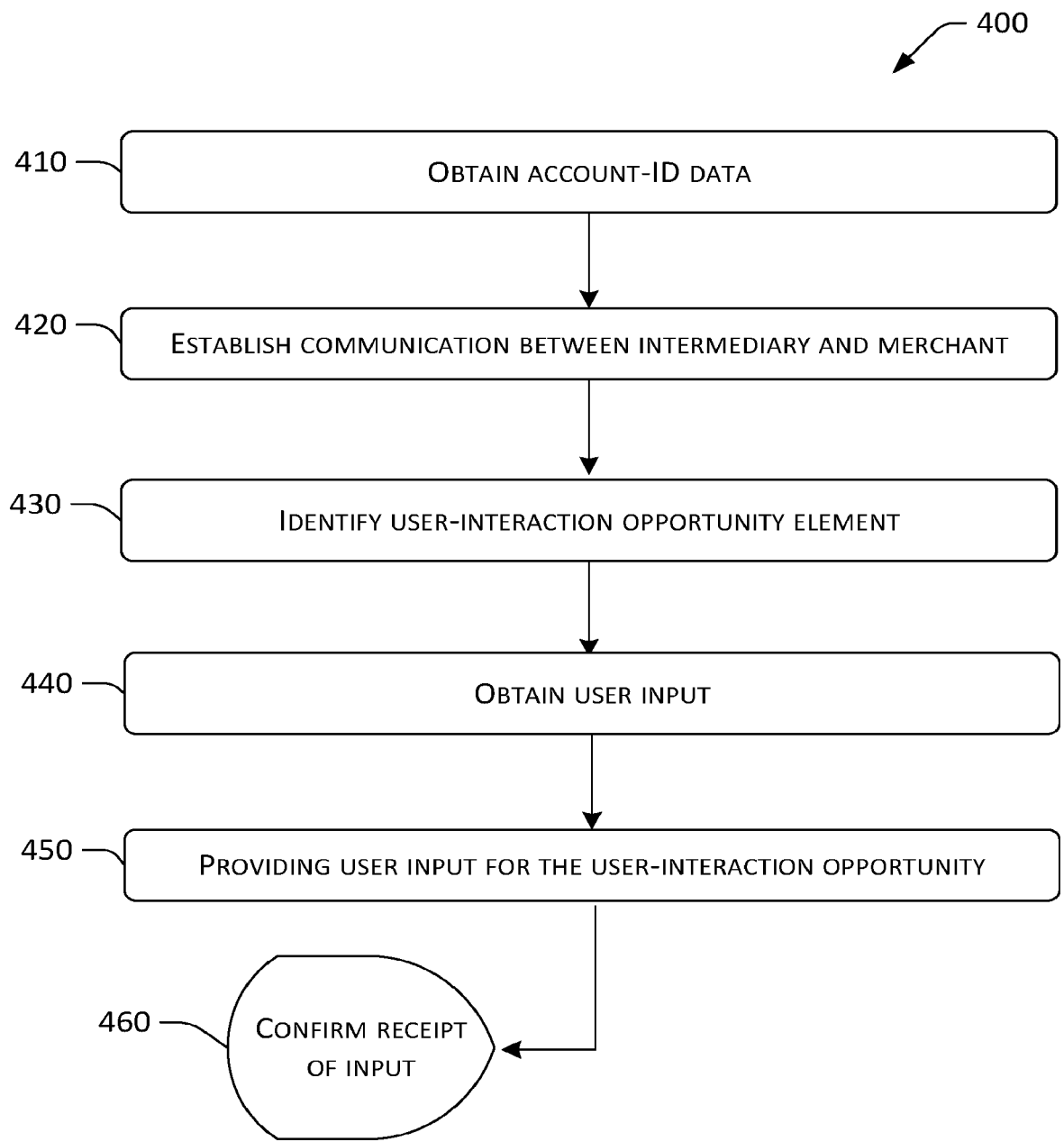
FIG. 4 is a flowchart of an example process 400 in accordance with the technology described herein.

FIG. 4 is a flowchart of an example process 400 in accordance with the technology described herein. This example process 400 may be implemented by the UMI 360 of the UMI Infrastructure 300 described above. The example process 400 is described as being performed by an example UMI, such as UMI 360.

At 410, the example UMI obtains account-identification data from a customer. The customer may be a direct customer (such as the account holder) or an indirect customer. An example of the account-identification data may be an account number for the account holder at a particular merchant. The UMI may obtain this data directly from an account holder via an online portal (e.g., website).

Alternatively or in addition, the example UMI obtains the customer-merchant credentials. Each customer-merchant credential is associated with an account holder and a merchant. For example, an account holder named Dorothy may have a username/password set associated with the website or payment system of "State Electric," a local utility.

Examples of the merchants are retailers, service providers, utilities, landlords, insurance companies, lenders, health care providers, leasing companies, banks, and credit card companies. An example online resource of a merchant includes a website, a payment system, and a mobile application ("app").

At 420, the example UMI establishes communication between an intermediary and the merchant on behalf of the account holder. While the communication is maintained, the example UMI provides the account-identification data to the merchant to identify the account holder to the merchant.

For example, the account holder Dorothy gives Financial Management Corporation (FMC) authority to handle and pay her bills. Thus, FMC is Dorothy's payer. Dorothy gives FMC her account number for State Electric. FMC uses example UMI to automate its interactions with various merchants, including State Electric. On behalf of FMC, example UMI establishes communication with State Electric via their website or payment system. On State Electric's website or payment system, the example UMI provides Dorothy's account number in the appropriate user-interactions opportunity element (e.g., user-input for text).

In some implementations, the establishment of communication includes establishment of an online authenticated session between the intermediary and the online resource of the at least one merchant by using the one or more obtained customer-merchant credentials.

At 430, the example UMI identifies a user-interaction opportunity element available through the established communication.

The user-interaction opportunity element is a way for a user in the user-merchant interaction to provide input to the merchant. In an online communication, the user-interaction opportunity element includes one or more components of a user-interface (UI) of an online resource that provides for user input In an offline communication, the user-interaction opportunity element may be a voice or tonal response expected during a IVR telephone communication.

In other implementations, the user-interaction opportunity element includes one or more components of a user-interface (UI) of the online resource that provides for user input. For example, the UI may ask a user for a name and provide a text box within which text may be entered. The user-interaction opportunity element includes both the UI input mechanism (e.g., text box, radio button, slider, etc.) and the explanatory context around that UI (e.g., a question like "what is your address").

The example UMI determines what type of input that the identified available user-interaction opportunity element is seeking.

At 440, the example UMI obtains input from the user based on the type of input requested by the identified available user-interaction opportunity element. For example, the example UMI may generate a UI for the customer that replicates or emulates the available user-interaction opportunity element. For example, the customer may be given a similar UI input mechanism as the available user-interaction opportunity element with the explanatory context that was derived from that element.

For example, the user's input may be obtained by a presentation of a user-interface (UI) for the payer. That presentation includes incorporating the data regarding the available user-interaction opportunity element and receiving the user's input from the presented UI.

In other implementations, the user's input may be obtained by accessing a configuration database associated with the payer and/or the account holder and selecting an entry in the database associated with the available user-interaction opportunity element. In other implementations, the user's input may be obtained by accessing payment information associated with the payer and/or account-holder and generating the user's input that includes payer-associated or account-holder-associated payment information.

At 450, the example UMI provides the user's input for or to the user-interaction opportunity element. With online communication, this may be done via the online resource of the merchant, such as a webpage. For example, the example UMI may fill-in the UI input mechanism of the user-interaction opportunity element with the obtained input from the user. With offline communication, this may be done with voice recordings or tones with a telephony IVR system of the merchant.

In many implementations, the providing includes a generation of an application programming interface (API) call based on the user's input. The API call interacts with a resource based on the available payer-interaction opportunity element. The providing also includes sending the generated API call to the online resource of the merchant and obtaining a response from the merchant confirming a successful reception of the API call.

At 460, the example UMI confirms and/or reports on the successful receipt of the user's input by the merchant.

Figure 5:
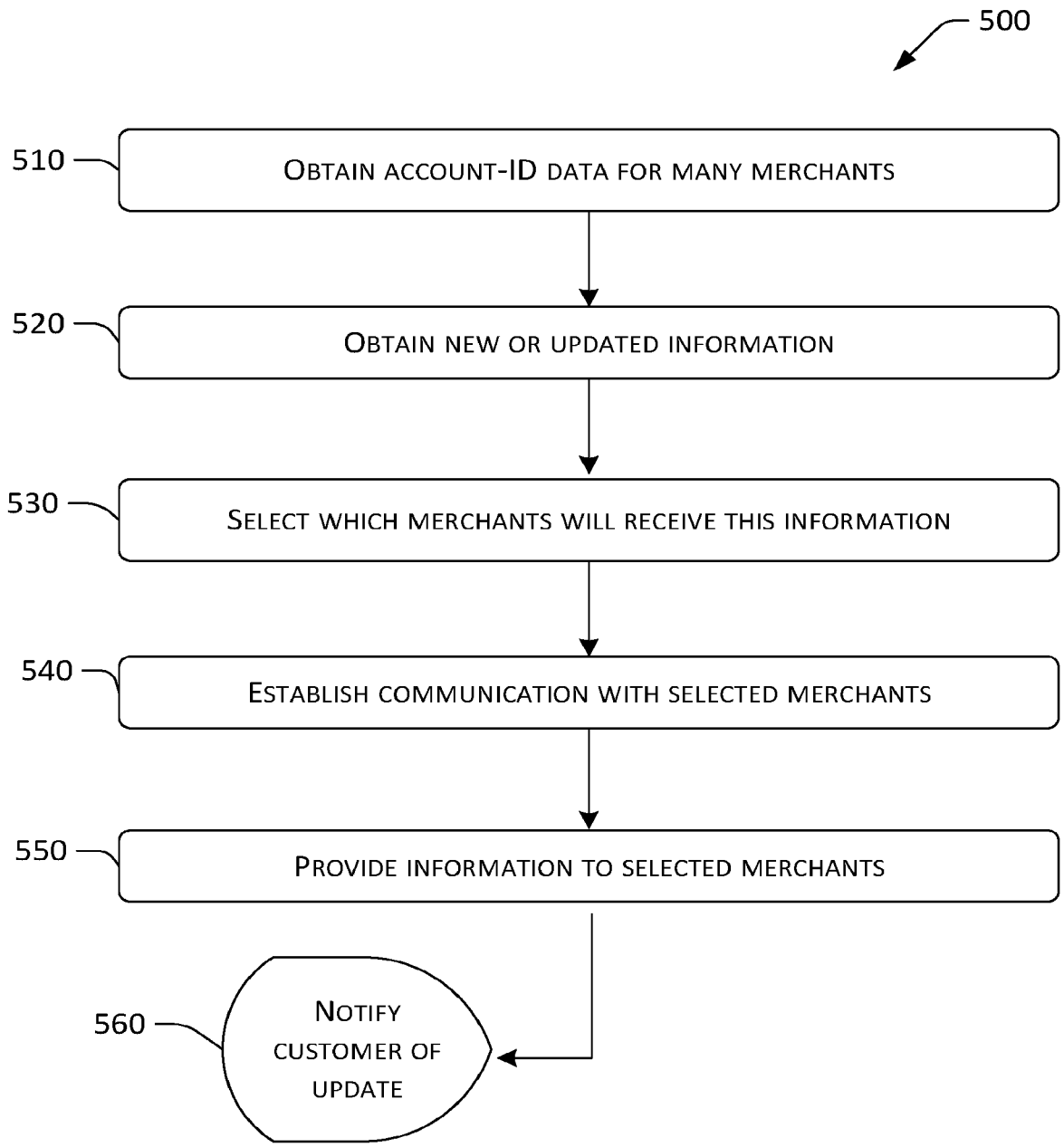
FIG. 5 is a flowchart of an example process 500 that facilitates an operation of a universal merchant intermediary between a customer and multiple online merchants in accordance with the technology described herein.

FIG. 5 is a flowchart of an example process 500 that facilitates an operation of a universal merchant intermediary between a customer and multiple online merchants in accordance with the technology described herein. This example process 500 may be implemented by the UMI 360 of the UMI Infrastructure 300 described above. The example process 500 is described as being performed by an example UMI, such as UMI 360.

At block 510, the example UMI obtains account-identification data from a customer about the account holder's account at each of multiple merchants. The account holder has at least one account for each of the multiple merchants. Thus, there is account-identification data (e.g., account number) for each account at each merchant. Each of the multiple merchants having an online or office communication resource.

Alternatively, block 510 may be described as the example UMI obtaining account-identification data by an intermediary. The account-identification data includes information identifying a customer-merchant relationship between the account holder and each merchant of multiple merchants that account holder has an account therewith.

The customer may be a direct payer (such as the account holder) or an indirect payer. An example of the account-identification data may be an account number for the account holder at a particular merchant. The UMI may obtain this data directly from an account holder via an online portal (e.g., website).

Alternatively or in addition, the example UMI obtains the customer-merchant credentials for the customer-merchant relationship of the account holder. Each customer-merchant credential is associated with an account holder and a merchant. For example, an account holder named Dorothy may have a username/password set associated with the website or payment system of "State Electric," a local utility.

Examples of the merchants are retailers, service providers, utilities, landlords, insurance companies, lenders, health care providers, leasing companies, banks, and credit card companies. An example online communication resource of a merchant includes a website, a mobile application ("app"), a payment system, API, and web services. An example offline communication resource of a merchant is a telephony system (i.e., phone system) such as an IRV system.

At block 520, the example UMI obtains new or updated information from a customer. The customer may be a direct payer, such as the account holder herself. In some instances, the payer may be an indirect payer, who acts on behalf and with the authorization of the account holder. The indirect payer is a separate party who is not identical to the account holder or the merchant.

This new or updated information is relevant to a customer-merchant relationship. That is, it is relevant to the relationship between the account holder and the merchant. Indeed, this new or updated information is personal and significant as discussed above to the merchant and/or account holder.

Examples of such new or updated information include the account-holder's physical address; mailing address; email address; telephone numbers; social media contact information; payment methods or preferences; personal or account information; other authorized payers; notification or communication preferences; subscription plans; service plans; closing account; and account opening.

The example UMI may obtain this information in one or more various ways. For example, this information may be obtained directly from the account holder or an indirect payer via a UI designed by the accepting entity to acquire this information. For this example, the example UMI may offer a UI to the customer and, in response, the customer provides the new or updated information. In some instances, the example UMI may recognize the customer providing new or updated information to or for a particular merchant via the merchant's online resource. The example UMI may determine that this information may be relevant to the customer-merchant relationship of other merchants.

At block 530, the example UMI selects which of the multiple merchants have communication resources configured to accept the new or updated information. That is, the example UMI selects which of the multiple merchants will receive this information.

The selection may be determined, for example, by examining a database of the multiple merchants and finding whether its communication resources are designed to receive information of the type of the new or updated information. In some implementations, this may involve the UMI establishing communication with the merchant to examine and analyze their resources to determine if that resource is designed to receive the new or updated information.

At block 540, the example UMI establishes communication between an intermediary and the determined communication resource of each of the selected merchants. This action may be done in direct and in synchronous response to the supplying of the new or updated information by the customer.

Alternatively, it may be done autonomously when the example UMI recognizes changes in the customer information in some context and determining that such information is relevant to the customer-merchant relationship of one or more merchants. Of course, in still other implementations, the example UMI may perform a semi-autonomous update for the information.

In one or more implementations, the establishment communication with a merchant includes forming an authenticated online customer-merchant session between the intermediary and the online resource of each of the online merchants by using one or more of the obtained customer-merchant credentials associated therewith.

At block 550, the example UMI provides the new or updated information via the communication resource of each of the established communication with the merchant. For example, the example UMI may update the selected merchants via established customer-merchant sessions established between the example UMI and the merchants' online resources.

At block 560, the example UMI sends a notification to the customer (and/or the account holder) that these updates have been performed. That notification may be in the form of electronic communication (e.g., email, text message, push notification, and the like).

Figure 6:
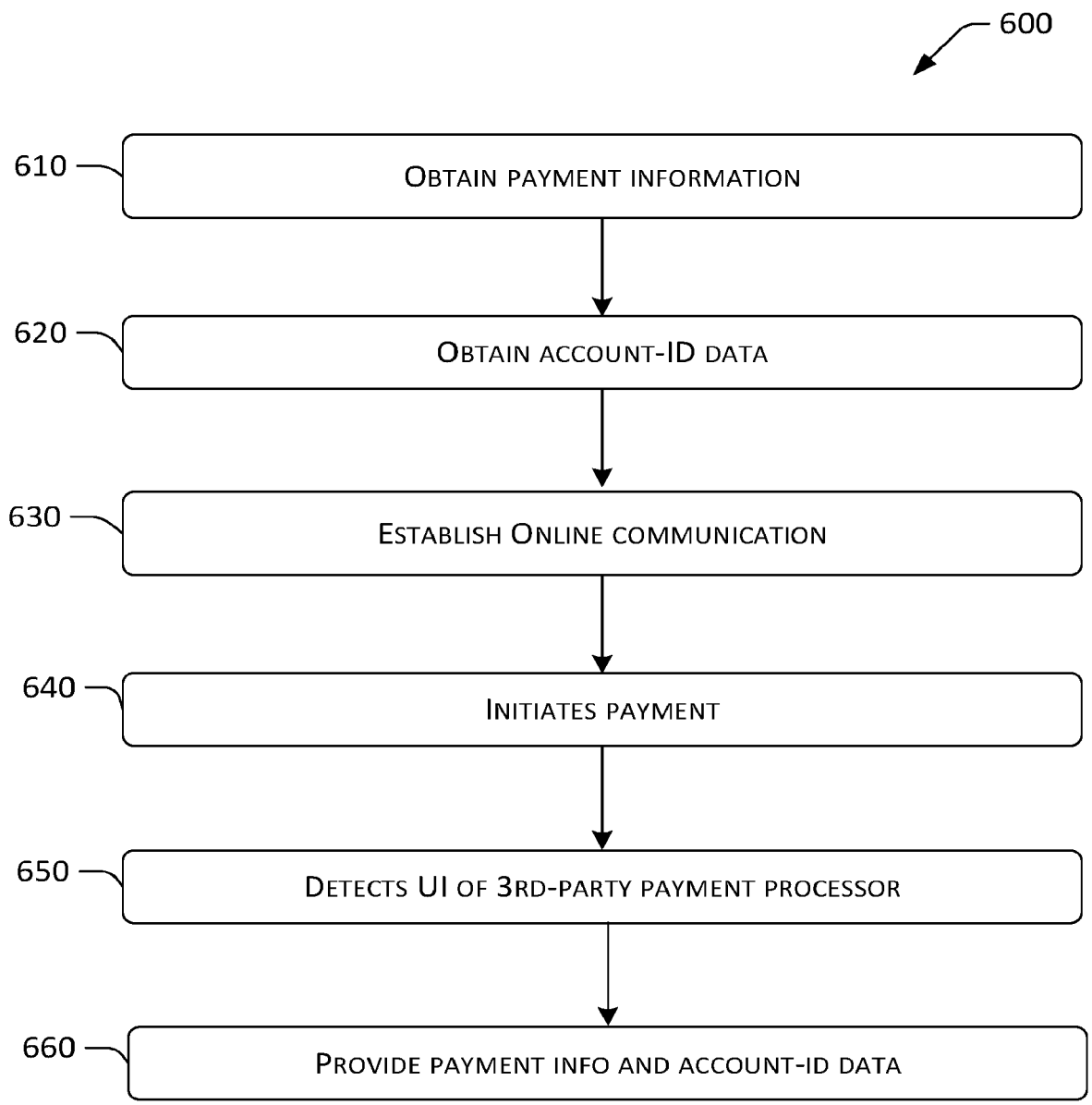
FIG. 6 is a flowchart of an example process 600 in accordance with the technology described herein.

FIG. 6 is a flowchart of an example process 600 in accordance with the technology described herein. This example process 600 may be implemented by the UMI 360 of the UMI Infrastructure 300 described above. The example process 600 is described as being performed by an example UMI, such as UMI 360.

Figure 7:
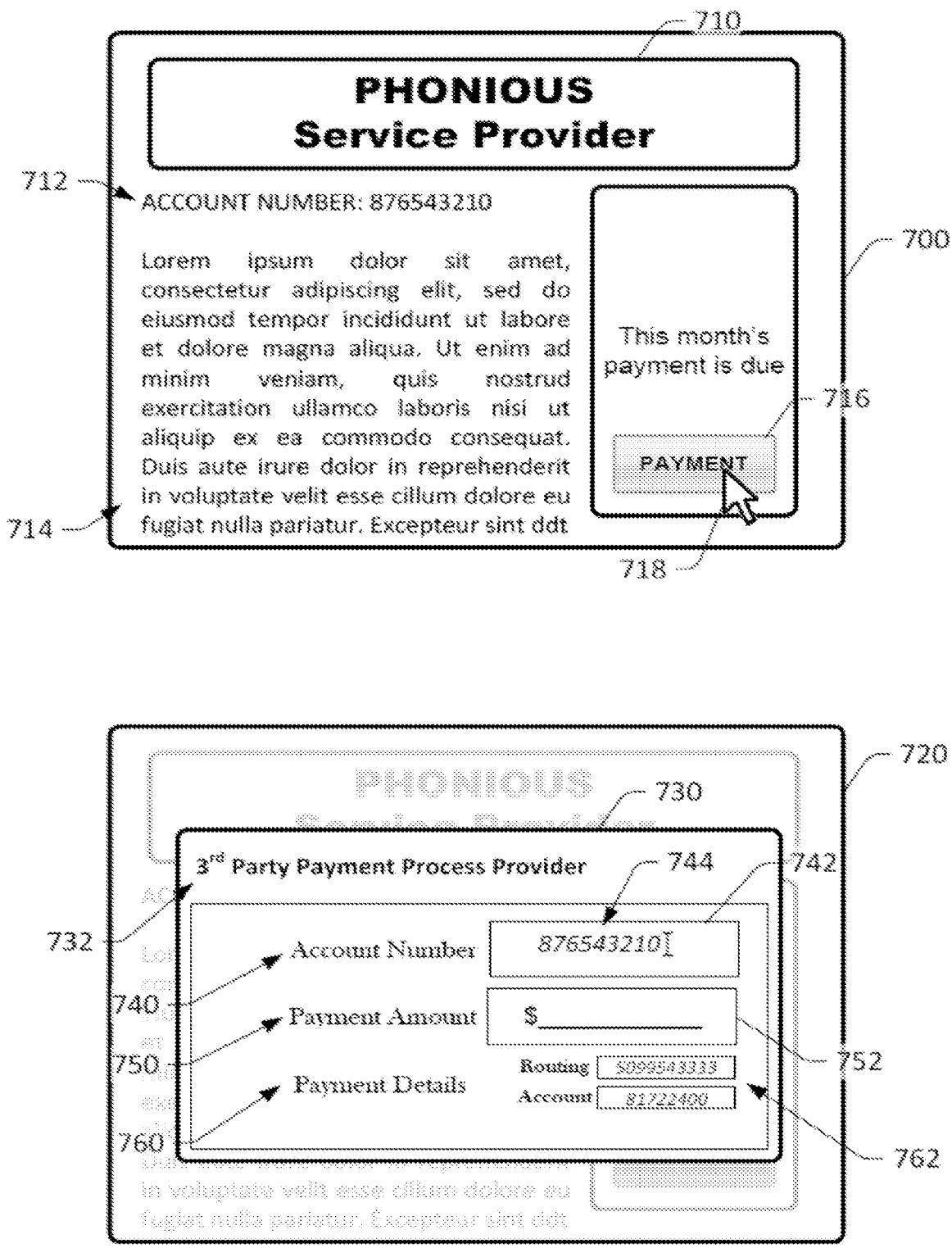
FIG. 7 illustrates an interaction with an example online resource of a merchant in the context of the example process 600.

FIG. 7 illustrates an interaction with an example online resource of a merchant in the context of the example process 600. FIG. 7 is referenced below to aid in the description of the example process 600.

At 610, the example UMI obtains payment information from a customer by an intermediary, wherein the payment information includes details of a funding source from which the customer authorizes payment therefrom. For example, payment information may include information related to the account-holder's checking account with her bank. That information may include, for example, name and address of the account holder, checking account number, a bank identifier (e.g., American Bankers Association (ABA) routing number), and the like.

The customer may be a direct payer, such as the account holder herself. In some instances, the customer may be an indirect payer, who acts on behalf and with the authorization of the account holder. The indirect payer is a separate party who is not identical to the account holder or the merchant.

One or more types of funding sources may be used. Examples of suitable funding sources credit card, bank account, checking account, savings account, debit card, loan, line of credit, prepaid cards, charge cards, gift cards and vouchers, money order, direct debit, online payment, cryptocurrencies, EFTPOS payments, wire transfer, electronic funds transfer (EFT), automated clearing house (ACH) payment, and the like. This payment information may be obtained, for example, directly from the customer, from a database of the account holder's or payer's preferred payment information, or from a link to the funding source.

In some implementations, the customer may choose a funding source other than that which is associated with the account holder. Instead, the funding source may be a credit or debit owned by or associated with the customer. In this instance, the customer may have a contractual relationship with the account holder that specifies how the account holder may repay, reimburse, and/or compensate the customer for extending its funds to pay for the account holder's bills.

Indeed, in some implementations, the funding source may be a credit or debit owned by or associated with the intermediary. In this instance, the intermediary may have a contractual relationship with the account holder or the customer that specifies how the account holder or customer may repay, reimburse, and/or compensate the intermediary for extending its funds to pay for the account holder's bills.

At 620, the example UMI obtains account-identification data. In some implementations, this data may be obtained from the customer. That is, the customer supplies the account-identification data to the intermediary.

The customer may be a direct payer (such as the account holder) or an indirect payer. An example of the account-identification data may be an account number for the account holder at a particular merchant. The UMI may obtain this data directly from an account holder via an online portal (e.g., website). Examples of the merchants are retailers, service providers, utilities, landlords, insurance companies, lenders, health care providers, leasing companies, banks, and credit card companies. An example online resource of a merchant includes a website, a payment system, an API, and a mobile application ("app").

Alternatively or in addition, the example UMI obtains the customer-merchant credentials. Each customer-merchant credential is associated with an account holder and a merchant.

At 630, the example UMI establishes an online communication between an intermediary and an online resource of the merchant.

FIG. 7 shows a single page or main window 700 of an example website of an example merchant, the PHONIOUS service provider, which is identified by a title banner 710. This could be direct interaction with a payment system, website, API, voice system, or mobile app. This website is an example of an online resource of the example merchant. As depicted, the content of the main window 700 of an example website includes the title banner 710, the account holder's account number 712, miscellaneous text 714, and a payment button 716. Of course, the content of the online resource may be located on other webpages, fields, or sections.

In some implementations, the establishment of the online communication includes a formation of an authenticated session between the intermediary and the online resource of the at least one merchant by using one or more customer-merchant credentials.

In some implementations, the example UMI obtains the account-identification data from the online resource of the merchant rather than from the customer. The account-identification data may be included as part of the content available on the online resource during the online communication. The account-identification data identifies an account of the account holder with the merchant. For example, if the merchant is a wireless phone service provider, then the account-identification data may be the account-holder's phone number. Alternatively, the account-identification data identifies the account holder.

Example webpage 700 includes the account holder's account number 712 as part of the content available on the online resource during the online communication. The UMI selects this number as the account-identification data. In some implementations, the UMI may also determine the amount of the payment due from the content available on the online resource during the online communication.

At 640, the example UMI initiates a payment using the payment information provided by the customer and the account-identification data via the online resource of the online communication. This initiation may be triggered by the payer selecting to make a payment via the online resource. This is depicted in FIG. 7 by a cursor 718 over the payment button 716.

At 650, the example UMI detects, in response to the payment initiation, a user-interface (UI) of a third-party payment processor that employs a modal window to accept input regarding the obtained payment information and the account-identification data. That is, the example UMI detects the use of a payment gateway. This payment gateway employs, for example, a child window that limits access to the originating main window or website of the customer-merchant session.

In UI design for computer applications, a modal window is a graphical control element subordinate to an application's main window. A modal window creates a mode that disables the main or parent window. But, typically, the main window remains at least partially visible. The modal window, as a child window, in front of the parent window. Payers must interact with the modal window before they can return to the parent window or application. This avoids interrupting the workflow on the main window. Modal windows are sometimes called heavy windows or modal dialogs because they often display a dialog box.

A third-party payment processor is an entity other than the merchant associated with the online resource. Acting as an agent for the merchant, this other entity handles the online payment processing for the merchant. The third-party payment processor is appointed by a merchant to handle online transactions from various channels such as credit cards and debit cards for merchant acquiring banks.

Typically, in an operation that will usually take a few seconds, the payment processor will both check the details received by forwarding them to the respective card's issuing bank or card association for verification and also carry out a series of anti-fraud measures against the transaction. Once the payment processor has received confirmation that the credit card details have been verified, the information will be relayed back via the payment gateway to the merchant, who will then complete the payment transaction. If verification is denied by the card association, the payment processor will relay the information to the merchant, who will then decline the transaction.

As shown in FIG. 7, parent window 720 represents an obscured version of the main window 700. All of the input controls of the parent window 720 are obscured and unavailable. Instead, a modal window 730 is displayed over the obscured parent window 720. The modal window 730 is a child of parent window 720 and is launched in response to the payment initiation. The modal window 730 acts as a payment gateway.

The modal window 730 has a header describing the window as being part of the "3$^{rd}$ Party Payment Process Provider." Indeed, the control of the UI and the content of the UI is managed by the third-party payment processor. The UI includes account-number label 740 and text-entry box 742. The UI also includes payment-amount label 750 and number-entry box 752. In addition, the UI also includes a payment-details label 760 (which includes routing and account information) and several data entry boxes 762 for entering the payment information.

At 660, the example UMI provides the obtained payment information and the account-identification data via the UI of the model window. Based on modal window 730, the UMI provides routing number ("5099543333") and banking account number ("81722400") in the payment details' data entry boxes 762. In other instances, the example UMI may fill-in the payment amount in that number-entry box 752.

Once the UI of the modal window is completed, the payer is presented once again with the main window 700. While this implementation is described in terms of a modal window, alternative implementations may involve a separate third-party website. Once the payer imitates a payment, the payer is taken to the separate third-party website as the payment gateway. Once the payment process is completed, the payer is returned to the originating website, like that shown by main window 700.

While the discussion of the example process 600 and its accompanying FIG. 7 have focused on a website as the online resource of the merchant, other types of online resources may be employed. For example, a desktop or mobile application ("app") may be employed. Those implementations may also employ parent and child windows as was described above.

Additional and Alternative Implementation Details

Reference herein to "one embodiment" or "an embodiment" refers to one or more features, structures, materials, or characteristics described at least one example embodiment of the technology described herein. It does not denote or imply that the features, structures, materials, or characteristics are present in every embodiment. Thus, the appearances of the phrases "in one embodiment" or "in an embodiment" in various places throughout this document are not necessarily referring to the same embodiment of the technology. Furthermore, the features, structures, materials, or characteristics may be combined in any suitable manner in one or more embodiments.

In the above description of example implementations, for purposes of explanation, specific numbers, materials configurations, and other details are set forth to explain better the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

Moreover, the word "example" is used herein to mean serving as an example, instance, or illustration. Any aspect or design described herein as "example" is not necessarily to be construed as preferred or advantageous over other aspects or designs. Rather, use of the word example is intended to present concepts and techniques in a concrete fashion. The term "techniques," for instance, may refer to one or more devices, apparatuses, infrastructure, methods, articles of manufacture, and computer-readable instructions as indicated by the context described herein.

As used in this application, the term "or" is intended to mean an inclusive "or" rather than an exclusive "or." That is unless specified otherwise or clear from context, "X employs A or B" is intended to mean any of the natural inclusive permutations. That is if X employs A; X employs B; or X employs both A and B, then "X employs A or B" is satisfied under any of the preceding instances. Also, the articles "an" and "an" as used in this application and the appended claims should be construed to mean "one or more," unless specified otherwise or clear from context to be directed to a singular form.

These processes are illustrated as a collection of blocks in a logical flow graph, which represents a sequence of operations that can be implemented in mechanics alone or a combination of hardware, software, and firmware. In the context of software/firmware, the blocks represent instructions stored on one or more computer-readable storage media that, when executed by one or more processors, perform the recited operations.

Note that the order in which the processes are described is not intended to be construed as a limitation and any number of the described process blocks can be combined in any order to implement the processes or an alternate process. Additionally, individual blocks may be deleted from the processes without departing from the spirit and scope of the subject matter described herein.

The term "computer-readable media" is non-transitory computer-storage media. For example, non-transitory computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)). Similarly, the term "machine-readable media" is non-transitory machine-storage media. Likewise, the term "processor-readable media" is non-transitory processor-storage media.

A non-transitory machine-readable storage medium can cause a machine to perform the functions or operations described, and includes any mechanism that stores information in a form accessible by a machine (e.g., computing device, electronic infrastructure, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

In the claims appended herein, the inventors invoke 35 U.S.C. § 112(f) only when the words "means for" or "steps for" are used in the claim. If such words are not used in a claim, then the inventors do not intend for the claim to be construed to cover the corresponding structure, material, or acts described herein (and equivalents thereof) in accordance with 35 U.S.C. 112(f).

A non-transitory machine-readable storage medium can cause a machine to perform the functions or operations described, and includes any mechanism that stores information in a form accessible by a machine (e.g., computing device, electronic infrastructure, etc.), such as recordable/non-recordable media (e.g., read-only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

What is claimed is:

1. A method comprising:
    obtaining account-identification data by an intermediary, wherein the account-identification data is associated with an account holder and a merchant;
    establishing communication between an intermediary and the merchant on behalf of the account holder, the establishing includes providing the account-identification data to the merchant to identify the account holder to the merchant;
    via the established communication:
        identifying a user-interaction opportunity element available through the communication, wherein the user-interaction opportunity element is a user interface element from the merchant website; and
        determining the information requested by the identified user-interaction opportunity element, the identified user-interaction opportunity element comprising a first UI input mechanism having a first type;
    generating a replicate user interface that emulates the user-interaction opportunity element, the replicate user interface comprising a replicated user-interaction opportunity element that includes a second UI input mechanism having the first type and explanatory context for the second UI input mechanism;
    obtaining input from a user, wherein the user's input being is obtained via the replicate user interface;
    automatically providing user's input for the user-interaction opportunity element.

2. The method of claim 1 wherein the merchant is selected from a group consisting of retailers, service providers, utilities, landlords, insurance companies, lenders, health care providers, leasing companies, banks, and credit card companies.

3. The method of claim 1 wherein the established communication with the merchant is selected from a group consisting of a website, a mobile application ("app"), a payment system, an application programming interface (API), web services, and phone systems.

4. The method of claim 1, wherein the establishing includes forming an authenticated session between the intermediary and the merchant by using one or more customer-merchant credentials.

5. The method of claim 1, wherein the established communication includes online communication between the intermediary and the merchant.

6. The method of claim 1, wherein the user-interaction opportunity element includes one or more components of a user-interface (UI) of an on line resource of a merchant that provides for user input.

7. The method of claim 1, wherein the providing the user's input for the user-interaction opportunity element includes:
    generating an application programming interface (API) call based on the user's input, wherein the API call is formatted to simulate a user interaction with an online resource based on the available user-interaction opportunity element;
    sending the generated API call to the established communication;
    obtaining a response from the merchant confirming a successful reception of the API call.

8. A non-transitory computer-readable storage medium comprising instructions that when executed cause a processor of a computing device to perform the method of claim 1.

9. A method that facilitates an operation of a universal merchant intermediary between a customer and multiple online merchants, the method comprising:
    generating, by an intermediary, a replicate user interface that emulates a first merchant user interface, the replicate user interface comprising a replicated user-interaction opportunity element that includes a UI input mechanism having a same type as a corresponding UI input mechanism on the first merchant user interface and explanatory context for the UI input mechanism;
    obtaining, via the replicate user interface, new or updated information from a customer by the intermediary, the new or updated information being potentially relevant to a customer-merchant relationship between an account holder and at least one of the multiple merchants;
    automatically determining that the new or updated information is relevant to the customer-merchant relationship for a subset of the multiple merchants;
    selecting, based upon the determination, which of the subset of multiple merchants has communication resources configured to receive the new or updated information;
    establishing communication between the intermediary and the selected subset of multiple merchants on behalf of the account holder by, in part, providing the account-identification data associated with each merchant of the subset of multiple merchants to that associated merchant;
    automatically providing the new or updated information to each of the selected subset of merchants via their associated established communication.

10. The method of claim 9 wherein the multiple merchants are selected from a group consisting of retailers, service providers, utilities, landlords, insurance companies, lenders, health care providers, leasing companies, banks, and credit card companies.

11. The method of claim 9, wherein the established communication is selected from a group consisting of a website, a payment system, a mobile application ("app"), an application programming interface (API), web services, and phone systems.

12. The method of claim 9, wherein the establishing includes forming an authenticated session between the intermediary and the selected merchants by using one or more customer-merchant credentials associated therewith.

13. The method of claim 9, wherein the new or updated information is selected from a group consisting of physical address of the account holder; mailing address; email address; telephone numbers; social media contact information; payment methods or preferences; personal or account information; creating accounts; closing accounts; authorized payers; notification or communication preferences; subscription plans; and service plans.

14. A non-transitory computer-readable storage medium comprising instructions that when executed cause a processor of a computing device to perform the method of claim 9.

15. A non-transitory computer-readable storage medium comprising instructions that when executed cause a processor of a computing device to:
- generate a replicate user interface that emulates a merchant user interface, the replicate user interface comprising a replicated user-interaction opportunity element that includes a UI input mechanism having a same type as a corresponding UI input mechanism on the first merchant user interface and explanatory context for the UI input mechanism;
- obtain customer payment information from a customer by an intermediary via the replicate user interface, wherein the customer payment information includes details of a funding source from which the customer authorizes payment therefrom;
- obtain account-identification data by the intermediary, wherein the account-identification data associates an account holder and the merchant;
- establish on line communication between the intermediary and an on line resource of the merchant on behalf of the account holder;
- via the online resource of the established communication, initiate a payment to the merchant;
- in response to the payment initiation, detect a user-interface (UI) that employs a modal window to accept input payment information and the account-identification data;
- automatically determine required information requested by the modal window;
- select relevant portions of the customer payment information based upon the required information; and
- automatically provide the relevant portions of the customer payment information and the account-identification data to the UI of the model window.

16. The non-transitory computer-readable storage medium of claim 15, wherein a merchant is selected from a group consisting of retailers, service providers, utilities, landlords, insurance companies, lenders, health care providers, leasing companies, banks, and credit card companies.

17. The non-transitory computer-readable storage medium of claim 15, wherein the established communication is selected from a group consisting of a website, a payment system, a mobile application ("app"), an application programming interface (API), web services, and phone systems.

18. The non-transitory computer-readable storage medium of claim 15, wherein the funding source is a selected from a group consisting of credit card, bank account, debit card, loan, line of credit, prepaid cards, charge cards, gift cards and vouchers, money order, direct debit, online payment, cryptocurrencies, EFTPOS payments, wire transfer, electronic funds transfer (EFT), automated clearing house (ACH) payment, or a combination thereof.

19. The non-transitory computer-readable storage medium of claim 15, wherein the funding source is a credit or debit owned by or associated with the account holder.

20. The non-transitory computer-readable storage medium of claim 15, wherein the funding source is a credit or debit owned by or associated with the customer.

* * * * *